Feb. 14, 1967 S. H. GLARUM 3,304,492
LINE SHARPENING IN SPECTROSCOPY BY THE INCLUSION OF HIGHER
ORDER DERIVATIVES IN THE ABSORPTION SPECTRUM
Filed June 23, 1964 4 Sheets-Sheet 1

INVENTOR
S. H. GLARUM
BY
ATTORNEY

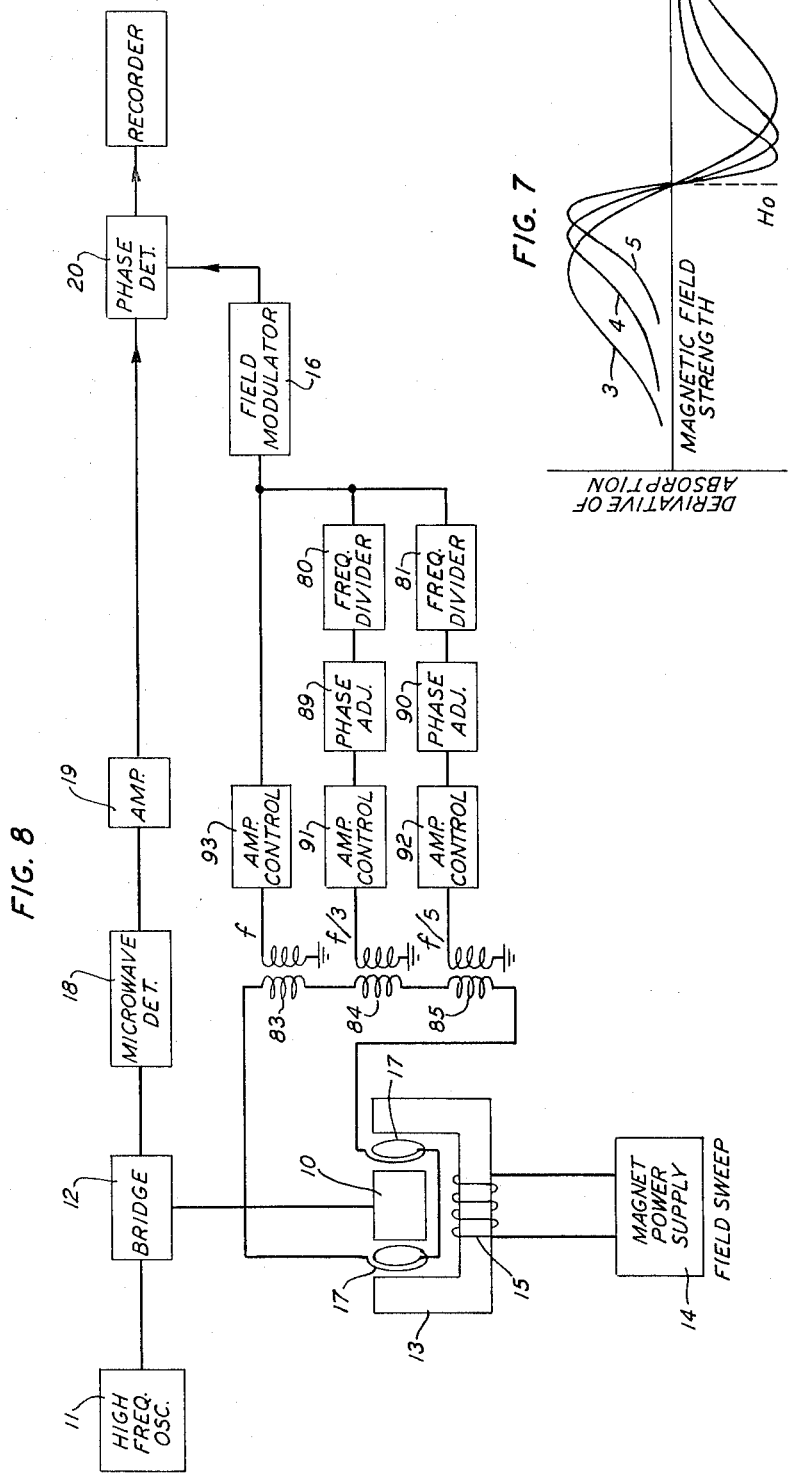

United States Patent Office 3,304,492
Patented Feb. 14, 1967

3,304,492
LINE SHARPENING IN SPECTROSCOPY BY THE INCLUSION OF HIGHER ORDER DERIVATIVES IN THE ABSORPTION SPECTRUM
Sivert H. Glarum, Morristown, N.J., assignor to Bell Telephone Laboratories, Incorporated, New York, N.Y., a corporation of New York
Filed June 23, 1964, Ser. No. 377,302
2 Claims. (Cl. 324—.5)

This invention relates to measuring devices and, in particular, to electron paramagnetic resonance spectrometers.

Electron paramagnetic resonance (EPR) spectroscopy senses the interaction of the magnetic moment of the electron with its environment, and is useful in revealing the chemical structure, binding characteristics, and other properties of atoms and molecules with a high degree of sensitivity and resolution.

Means for making EPR measurements are known in the art and are described in the literature. (See "Free Radicals," by D. J. E. Ingram, published by Academic Press, Inc., 1958, and "NMR & EPR Spectroscopy," by the NMR and EPR staff of Varian Associates, published by Pergamon Press.) The magnetic resonance spectra of molecules are often complex, consisting of many overlapping resonances. Since overlapping distorts each resonance curve, the true position and magnitude of individual resonances are obscured and, in some cases, weak resonances are totally concealed.

It is, therefore, the broad object of this invention to increase the resolution of electron paramagnetic resonance spectrometers.

The process of increasing the resolution of EPR spectrometers is known as line sharpening. Line sharpening can be achieved either by making an appropriate linear combination of an absorption spectrum and its even derivatives, or by a linear combination of odd derivatives of the absorption spectrum. Both processes make it possible to increase the resolution of the spectral presentation.

In the typical prior art EPR spectrometer, the applied magnetic field is sinusoidally modulated, and information reflected from a resonant cavity containing the sample material is detected, giving a first derivative presentation of absorption in the cavity as a function of magnetic field. (For a detailed description of such equipment see the instruction manual for V-4502 EPR Spectrometer Systems published by the Instrument Division of Varian Associates, Publication No. 87–100–077.)

In accordance with the present invention the magnetic field applied to the test sample is modulated by means of a complex waveform, which includes wave components at two or more related frequencies. The information contained on the microwave signal reflected from the resonant cavity is detected at a single frequency. If detection is to take place at a frequency $f$, the modulating waveform is made to contain components at frequency $f$ and odd subharmonics of frequency $f$, such as $f/3$, $f/5$, . . . .

In theory, an infinite number of derivatives will convert a resonance curve of finite width into a line. In practice, however, signal-to-noise limitations restrict the number of higher order derivatives that may be combined to two or three.

It is an advantage of the present invention that it is simple and, as such, can be readily integrated into existing EPR spectrometer systems. Furthermore, the proposed line sharpening arrangement functions independently of the rate of field sweep, and arbitrarily slow sweeps may be used for the study of very weak signals.

These and other objects and advantages, the nature of the present invention, and its various features, will appear more fully upon consideration of the various illustrative embodiments now to be described in detail in connection with the accompanying drawings, in which:

FIG. 1 shows the essential elements of a prior art EPR spectroscope;

FIG. 2, included for purposes of explanation, is a simple absorption spectrum having a single resonance;

FIG. 3, included for purposes of explanation, is the first derivative curve of the absorption spectrum of FIG. 2;

FIG. 4, included for purposes of explanation, is an absorption spectrum showing three resonance lines;

FIG. 7 shows the manner in which the addition of higher order derivatives produces line sharpening;

FIG. 8 is a spectrum analyzer in accordance with the invention, including means for generating higher order derivative curves.

Figure 1:
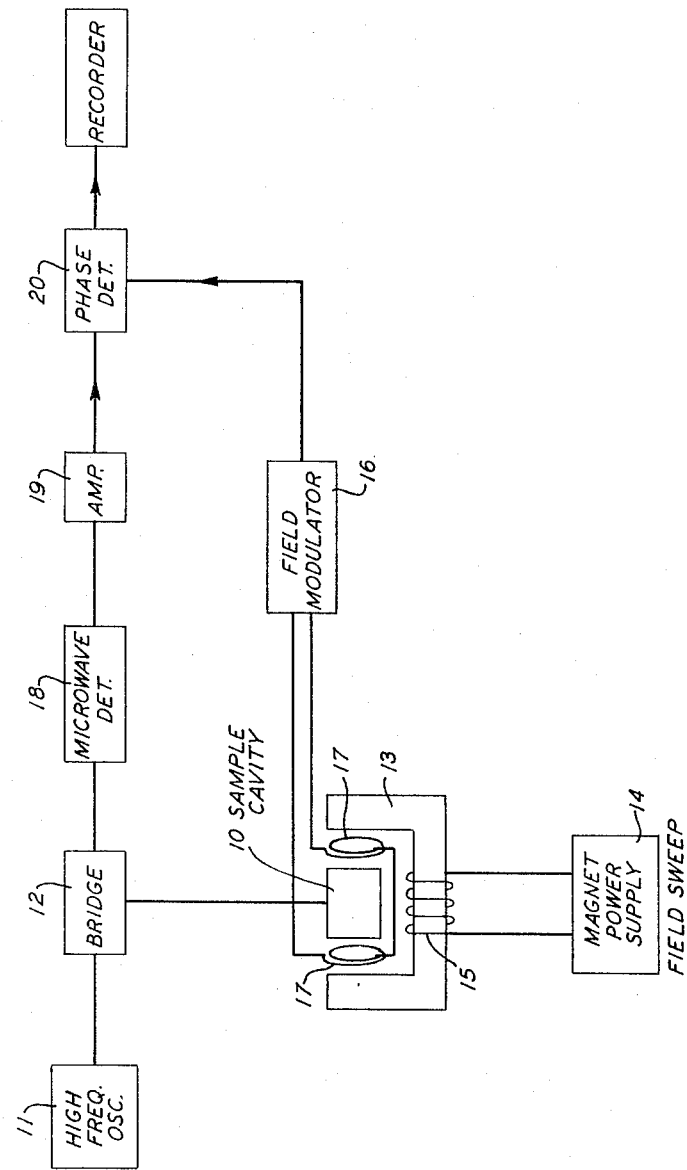

Referring to the drawing, FIG. 1 shows the essential elements of a prior art EPR spectrometer. Basically, it is the function of the device to detect the power lost in a test sample due to electron resonance. As such, it comprises a cavity 10 in which the sample of material to be tested is located and which is tuned to resonance at a chosen high (microwave) signal frequency. Energy at this frequency is derived from a high frequency oscillator 11 which supplies the energy to a microwave bridge 12, one arm of which is the cavity 10.

The test material is immersed in a homogeneous magnetic field provided by an electromagnet which includes a magnetic core 13 and a magnet power supply 14. The latter supplies current to a coil 15 on core 13 to produce a magnetic field which can be varied from near zero to several thousand gauss. This supply is accordingly referred to as the field sweep generator.

The gyromagnetic ratio of the electron is approximately 2.8 megacycles per gauss. Since work in EPR is frequently done at about 10 kilomegacycles, the necessary field strength for operation at that frequency is about 3500 gauss. In typical high resolution EPR experiments the magnetic field is swept by the field sweep generator over ranges of 10 gauss to 100 gauss about the 3500 gauss field.

In addition to this field sweep, there is a field modulator 16 which amplitude modulates the magnetic field at audio frequencies by means of field modulation coils 17. The purpose of this modulator is considered in greater detail hereinbelow.

Figure 2:
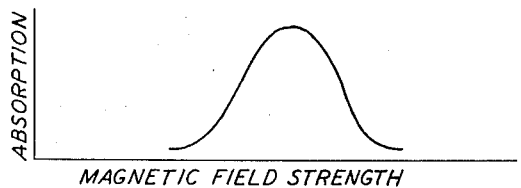

Cavity 10, which is one arm of bridge 12, varies in impedance as the applied magnetic field intensity is varied. This change in impedance, due to resonance effects, results in an unbalance, which modulates the reflected microwave signal. This modulation is detected by a microwave detector 18 and after further amplification in amplifier 19 can be displayed as a spectrum as shown in FIG. 2.

Figure 3:
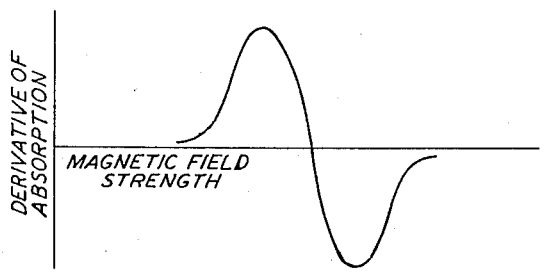

In normal EPR operation, however, as noted above, the magnetic field is modulated by means of an audio sine wave provided by the field modulator 16. When this is done, and the output from amplifier 19 is further detected in a phase detector 20 operated coherently with the field modulator, a signal proportional to the first derivative of the spectrum shown in FIG. 2 is obtained. The first derivative display is shown in FIG. 3.

(For a more detailed discussion of the operation of an EPR spectrometer, see the above-mentioned book and instruction manual.)

Figure 4:
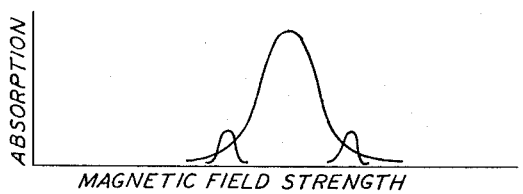
Figure 5:
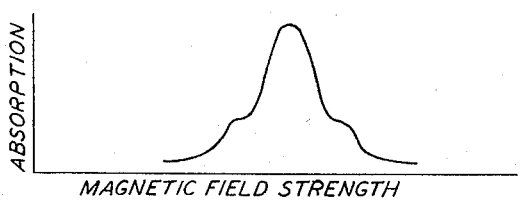
FIG. 5 is a composite curve of the spectrum of FIG. 4, illustrating the masking effect upon the smaller resonance lines.
Figure 6:
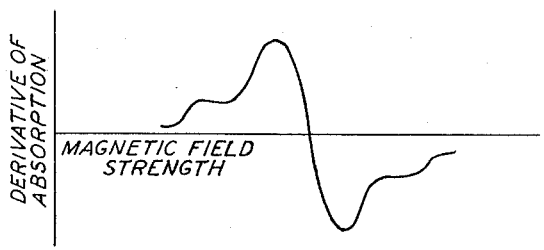
FIG. 6 is a first derivative curve of the absorption spectrum of FIG. 5.

For those materials which have more than one resonance, overlapping of resonances typically occurs, making it difficult, and often impossible, to estimate the positions and relative amplitudes of the weaker resonances. For example, a spectrum having three resonances, as illustrated in FIG. 4 has a combined resonance as shown in FIG. 5. It is apparent that the precise locations, and relative amplitudes of the two smaller lines 1 and 2, shown separately in FIG. 4, are not clearly defined in the composite spectral curve of FIG. 5. Similarly, while the first derivative curve shown in FIG. 6 also discloses the presence of the two smaller lines, it does not define their location with any degree of accuracy.

It can be shown mathematically that if the magnetic field applied to the sample is modulated by the $n^{th}$ subharmonic of a fundamental frequency $f$, and if the information on the reflected microwave signal is detected in a phase detector operated coherently with the fundamental frequency, the detected signal is the $n^{th}$ derivative of the resonance curve.

The present invention utilizes this effect to affect line sharpening by modulating the magnetic field applied to the sample by means of a complex wave which includes both the fundamental frequency and at least one odd subharmonic of the fundamental frequency. By phase detecting the information on the reflected microwave signal at the fundamental frequency, a signal which includes the first order derivative and at least one higher order, odd derivative is obtained. The proper combination of these odd order derivatives of the resonance spectrum concentrates the detected signal about the true centers of resonance. This effect is illustrated in FIG. 7 which shows the line shapes when the first derivative alone is used (curve 3), when the first and third derivatives are used (curve 4) and when the first, third and fifth derivatives are used (curve 5). As is clearly shown, when more derivative terms are added to the output signal there is a pronounced concentration of the curve about the resonance field $H_0$. Qualitatively, the use of $m$ terms reduces the linewidth by a factor of $m$. However, for a constant peak-to-peak field modulation amplitude, adding terms decreases the signal-to-noise ratio, thus placing a practical limit on the number of terms which may be added.

FIG. 8 is an illustrative embodiment of the invention including means for generating higher order odd derivative terms. As the embodiment utilizes all of the elements of the spectrometer shown in FIG. 1, the same identification numerals have been used for common components for convenience of understanding. Thus, the embodiment of FIG. 8 includes a sample cavity 10, a magnetic circuit including a magnetic core 13 and a field sweep generator 14. A high frequency signal, derived from a high frequency oscillator 11 is applied to cavity 10 by means of bridge 12. Reflected high frequency energy is coupled to a detector 18 where the modulation produced by the variations in cavity loading is detected. The detected signal is amplified in amplifier 19 and further detected in phase detector 20 which is operated coherently with the field modulator 16.

The embodiment of FIG. 8 differs from the spectrometer of FIG. 1 in that the field modulating signal is more complex and includes additional frequency components. In addition to the field modulating signal $f$, subharmonic components $f/3$ and $f/5$ are also included. These are produced by means of frequency dividers 80 and 81, which divide the frequency of the output from modulator 16 by a factor of ⅓ and ⅕, respectively. The resulting modulating signal components are coupled to the field modulation coils 17 by means of transformers 83, 84 and 85.

In order for the signals representing the higher order derivatives of the resonance curve to combine in a manner to produce line sharpening, they must be properly related in phase and amplitude. Proper phase coherency is insured by deriving all the subharmonic frequencies from the same signal source. Thus, in FIG. 8, the fundamental frequency and the subharmonic frequencies are derived from a common source 16, and the frequency dividers 80 and 81 are any of the well-known types of frequency-coherent dividers such as a counter or a synchronized multivibrator. To compensate for any spurious phase shift introduced in the respective circuits, additional phase adjust circuits 89 and 90 are provided. Proper phase is indicated when the output from phase detector 20 is maximum for each of the derivatives when observed individually.

The relative amplitudes of the several derivatives, for a specified amplitude of field modulation, can be evaluated mathematically. In the limit, for small modulation, the amplitudes are given by $$a_p \approx (-1)^{(p-1)/2}(p/\lambda)^{1/p}$$

where $p$ is the derivative order and $\lambda$ is an arbitrary coefficient scaling the amplitude of the modulating signal, selected so that the maximum peak-to-peak amplitude is smaller than the resonance line width.

A more practical way of adjusting the amplitudes of the derivative components is to observe the trace produced by the highest order derivative alone, and to add, in sequence, the lower order derivatives in such magnitudes as to minimize the overshoot and ripples in the tails of each resonance. This technique is readily mastered and is much quicker than attempting a mathematical evaluation. Amplitude control circuits 91, 92 and 93 are provided for this purpose.

Figure 9:
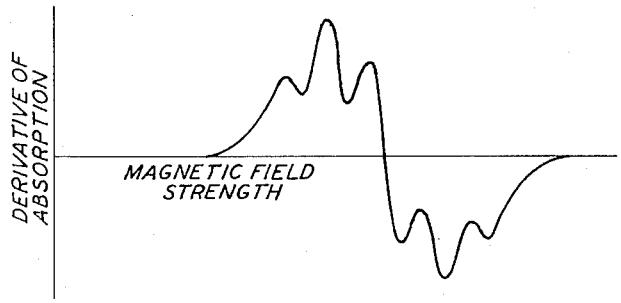
FIGS. 9, 10 and 11 show the effect of adding higher order derivatives to the first order derivative curve of a typical EPR absorption spectrum.
Figure 10:
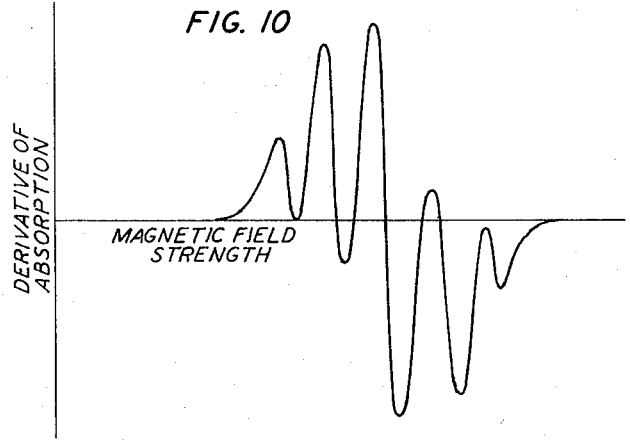
Figure 11:
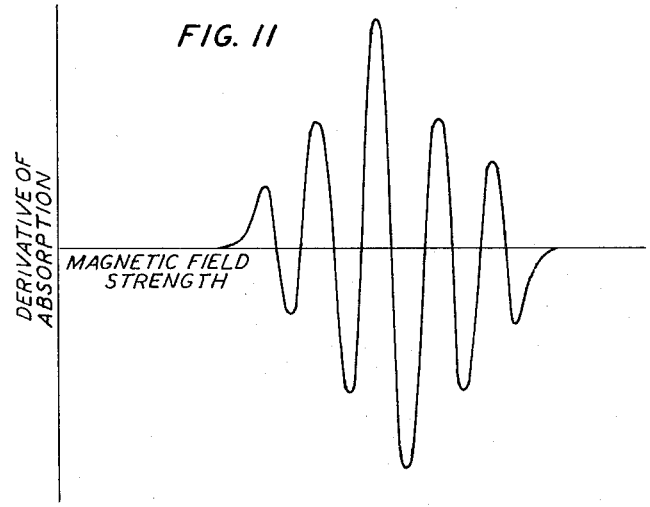

As explained hereinabove, the effect of modulating at the subharmonic frequencies and phase detecting at the fundamental frequency is to add higher order derivatives to the output of the spectrometer. The results of so doing are illustrated in FIGS. 9, 10 and 11 which show a simple first derivative curve, a combined first and third derivative curve and a combined first, third and fifth derivative curve, respectively, for the organic material diphenyl picryl hydrazyl (DPPH) in benzene solution. This material has five equally spaced resonances which have relative amplitude ratios of 1:2:3:2:1. While the curves of FIG. 9 and FIG. 10 show the presence of the five resonances, only the curve of FIG. 11 gives their locations and relative amplitudes with accuracy.

While the invention has been described in connection with the electron paramagnetic resonance spectroscopy, it is evident that the invention can readily be applied to other forms of spectroscopy. Thus, in all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

What is claimed is:
1. A spectrum analyzer comprising:
  a cavity adapted for housing a sample to be tested and tuned to a signal frequency;
  means for applying a magnetic field to said sample;
  means for sweeping the amplitude of said field;
  means for amplitude modulating said magnetic field simultaneously at a fundamental frequency and at at least one odd subharmonic of said fundamental frequency;

means for applying wave energy to said cavity at said signal frequency;

and means including a phase detector operated coherently with said fundamental frequency for detecting the fundamental frequency component contained in the information modulating the wave energy reflected from said cavity.

2. The analyzer according to claim 1 wherein said subharmonics are derived from frequency-coherent frequency dividers energized from a common source at said fundamental frequency.

References Cited by the Examiner

UNITED STATES PATENTS 2,995,698  8/1961  Collins _____ 324—0.5

WALTER L. CARLSON, *Primary Examiner.*

RUDOLPH V. ROLINEC, *Examiner.*

M. J. LYNCH, *Assistant Examiner.*